(12) United States Patent
Svedman et al.

(10) Patent No.: US 9,980,314 B2
(45) Date of Patent: May 22, 2018

(54) METHOD AND APPARATUS FOR IRREGULAR SIGNAL TRANSMISSION IN A SYSTEM WITH RECEPTION GAPS

(71) Applicants: ZTE Wistron Telecom AB, Kista (SE); ZTE (TX) INC., Austin, TX (US)

(72) Inventors: Patrick Svedman, Kista (SE); Yonghong Gao, Kista (SE); Aijun Cao, Kista (SE); Thorsten Schier, Kista (SE); Bojidar Hadjiski, Kista (SE); Jan Johansson, Kista (SE)

(73) Assignee: ZTE WISTRON TELECOM AB, Kista (SE)

(*) Notice: Subject to any disclaimer, the term of this patent is extended or adjusted under 35 U.S.C. 154(b) by 23 days.

(21) Appl. No.: 15/024,338

(22) PCT Filed: Sep. 16, 2014

(86) PCT No.: PCT/US2014/055918
§ 371 (c)(1),
(2) Date: Mar. 23, 2016

(87) PCT Pub. No.: WO2015/047800
PCT Pub. Date: Apr. 2, 2015

(65) Prior Publication Data
US 2016/0234878 A1  Aug. 11, 2016

Related U.S. Application Data

(60) Provisional application No. 61/881,674, filed on Sep. 24, 2013, provisional application No. 61/937,202, filed on Feb. 7, 2014.

(51) Int. Cl.
*H04W 76/00* (2018.01)
*H04W 76/04* (2009.01)
(Continued)

(52) U.S. Cl.
CPC ........ *H04W 76/048* (2013.01); *H04W 8/005* (2013.01); *H04W 68/005* (2013.01)

(58) Field of Classification Search
CPC .......... H04L 27/2657; H04L 2027/003; H04L 2027/0048; H04L 2027/0095; H04L 27/0014
See application file for complete search history.

(56) References Cited

U.S. PATENT DOCUMENTS

| 2011/0256824 A1 | 10/2011 | Futaki et al. |
| 2011/0268101 A1 | 11/2011 | Wang et al. |

(Continued)

OTHER PUBLICATIONS

International Search Report/Written Opinion dated Dec. 22, 2014, in corresponding International Application No. PCT/US2014/055918.

*Primary Examiner* — Chandrahas B Patel
(74) *Attorney, Agent, or Firm* — Duane Morris LLP

(57) ABSTRACT

The proposed approach contemplates systems and methods configured to transmit signals irregularly (sparsely) over a mobile communication network (carrier) in which reception gaps apply while increasing the likelihood that receivers will receive a signal at least once during a certain time period, called irregular signal period. First, a set of transmission offsets is selected, the transmission offsets defining a relative transmission time in a burst, such that if a burst would be transmitted using the selected transmission offsets, a receiver with any valid reception gap configuration would receive at least one signal in its whole duration. Then, during an irregular signal period, signals are transmitted in a sequence of one or more consecutive bursts using each of the transmission offsets in the selected set at least once, wherein the sequence of bursts may be preceded and/or followed by a period of no signal transmission. Finally, a receiver (Continued)

receives at least one of the irregular signals in its whole duration during one of the reception gaps of the receiver.

39 Claims, 10 Drawing Sheets

(51) Int. Cl.
  *H04W 68/00* (2009.01)
  *H04W 8/00* (2009.01)

(56) References Cited

U.S. PATENT DOCUMENTS

2012/0188907 A1   7/2012  Dayal et al.
2016/0183173 A1*  6/2016  Harada ................ H04W 48/12
                                                      455/434

\* cited by examiner

METHOD AND APPARATUS FOR IRREGULAR SIGNAL TRANSMISSION IN A SYSTEM WITH RECEPTION GAPS

RELATED PATENT APPLICATIONS

This application is a 371 National Phase Application from International Application No. PCT/US2014/055918, filed Sep. 16, 2014 and claims benefit of priority under 35 U.S.C. § 119(e) to Provisional Application No. 61/881,674, entitled "METHOD AND APPARATUS FOR IRREGULAR SIGNAL TRANSMISSION IN A SYSTEM WITH RECEPTION GAPS," filed Sep. 24, 2013, which is incorporated by reference herein in its entirety.

This application also claims benefit of priority under 35 U.S.C. § 119(e) to Provisional Application No. 61/937,202, entitled "METHOD AND APPARATUS FOR IRREGULAR SIGNAL TRANSMISSION IN A SYSTEM WITH RECEPTION GAPS," filed Feb. 7, 2014, which is incorporated by reference herein in its entirety.

FIELD OF THE INVENTION

The present invention relates generally to cellular telecommunication systems, especially to transmission of irregular signals over a mobile communication network.

BACKGROUND OF THE INVENTION

The time duration (henceforth "duration") of a transmitted signal in a communication system is defined or determined, at least in part, based on the purpose of the signal. A receiver can use the signal properly if it is received in its whole duration. Note that if the receiver receives a signal in only a part of its duration, the receiver may still use the received part for the purpose of the signal. However, the performance, quality or success rate or the operations that are the purpose of the signal will typically be degraded, compared to if the signal was received in its whole duration. For some types of signals, it may be acceptable to receive only a part of its duration. For such signals, a missing portion can be received later in time to complete the processing in accordance with the purpose of the signal. For a non-limiting example, some signals are split into multiple different signal parts that are separated in time. Repetitive signals may be split in multiple different repetitive signal parts. In one non-limiting example, a receiver uses the multiple signals parts to perform the operations that are the purpose of the signal. Therefore, the signal duration spans the multiple signal parts. However, for some other signals, a missing part cannot be received at a later time to complete processing in accordance with the purpose of the signal. Such signals must be received in its whole duration to be properly used.

In some cases, a receiver may receive multiple signals in their whole durations, in order to further improve the performance, quality or success rate of the operations that are the purpose of the signal. For a non-limiting example, the multiple signals can be received in different time periods, different frequencies, different code spaces (using different codes of some kind) or a combination of these. For a non-limiting example, an Long-Term Evolution (LTE) user equipment (UE) may receive multiple primary synchronization signals (PSSs) in their whole durations in different subframes in order to improve detection performance, for example. In the PSS example, a UE combines multiple identical signals. In another LTE example, several (up to 6, for example), LTE positioning reference signals (PRSs) may be transmitted in consecutive subframes, making it possible for UEs to improve the measurements for positioning by combining these PRSs in their whole durations. In another LTE example, a UE may combine multiple different signals in their whole durations, for example when a physical downlink shared channel (PDSCH) is retransmitted using a different redundancy version.

In some cases, a transmitter may transmit multiple signals simultaneously (in parallel), wherein the signals are of the same kind. For a non-limiting example, an LTE base station (eNB) may simultaneously transmit a different cell-specific reference signal (CRS) or channel state information reference signal (CSI-RS) from different antenna ports. A signal as defined above is typically transmitted continuously during its duration, i.e. with positive power, as for instance a primary synchronization signal (PSS) or a secondary synchronization signal (SSS). However, this is not necessary as some signals contain time-periods with zero transmit power, such as PRS and CSI-RS signals in LTE. Here are a few non-limiting examples of signal durations in LTE:

Primary Synchronization Signal (PSS) has the duration 1 LTE OFDM symbol. It is transmitted by an eNodeB (eNB). If a receiver (in LTE called a UE) receives a PSS in its whole duration, it can properly perform the operations that are the purpose of the PSS, e.g. detection, rough time/frequency synchronization and parameter estimation.

Secondary Synchronization Signal (SSS) has the duration 1 LTE OFDM symbol. It is transmitted by an eNB. If a UE receives an SSS in its whole duration, it can properly perform the operations that are the purpose of the SSS, e.g. determination of the physical cell id (PCI).

Cell-specific Reference Signal (CRS) (corresponding to an antenna port) has the duration 1 LTE OFDM symbol. It is transmitted by an eNB. If a UE receives a CRS in its, whole duration, it can properly perform the operations that are the purpose of the CRS, e.g. channel estimation.

Positioning Reference Signal (PRS) has a duration of 11 LTE OFDM symbols. Its power during a few of these OFDM symbols is zero. It is transmitted by an eNB. If a UE receives a PRS in its whole duration, it can properly perform the operations that are the purpose of the PRS, e.g. time of arrival estimation.

Channel State Information Reference Signal (CSI-RS) has a duration of 2 (if 1 or 2 antenna ports) or 9 OFDM symbols (if more than 2 antenna ports), depending on the configuration. In the case of a 9 OFDM symbol CSI-RS signal, only the first two and last two of these have non-zero power. It is transmitted by an eNB. If a UE receives a CSI-RS in its whole duration, it can properly perform the operations that are the purpose of the CSI-RS, e.g. computing a channel quality indicator (CQI).

Physical Broadcast Channel (PBCH) has the duration 4 LTE OFDM symbols. It is transmitted by an eNB. A PBCH carries system information. If a UE receives a PBCH in its whole duration, it can properly perform the operations that are the purpose of the PBCH, e.g. successful extraction of the system information.

Physical Downlink Shared Channel (PDSCH) has the duration 1 LTE subframe (minus the first 1-3 LTE OFDM symbols used for PDCCH/PCFICH/PHICH). It is transmitted by an eNB. A PDSCH carries data (in one or more transport blocks) to a UE. If a UE receives a PDSCH meant for the UE in its whole duration, it can properly perform the operations that are the purpose of the PDSCH, e.g. successful extraction of the data.

Discovery Signal (DS) on unused resource elements (REs) next to PSS/SSS has the duration 2 OFDM symbols, wherein the signal is transmitted by an eNB. If a UE receives a DS in its whole duration, it can properly perform the operations that are the purpose of the DS, e.g. successful discovery of a small cell.

The LTE examples listed above and below are given for LTE frequency division duplexing (FDD) with normal cyclic prefix (CP). For other LTE configurations, other numbers may apply.

For some signals, especially multi-purpose signals, there are multiple interpretations of the duration, depending on which purpose of the signal that is considered. In the example of LTE CRS, some operations, such as channel estimation, may only require the reception of a single OFDM symbol containing CRS. Other operations, such as frequency offset estimation, may require the reception of multiple OFDM symbols containing CRS to function properly.

In communication systems, signals may be transmitted repetitively in their whole duration. For a non-limiting example, the same signal can be transmitted repeatedly, such as PSS in LTE, which is transmitted during 1 OFDM symbol every 5th subframe. For a CSI-RS in LTE, its transmission period is configurable to between 5 and 80 ms. In another example of repetitive signal transmission, the same kind of signal is transmitted repeatedly, but with some variation in consecutive repetitions. For a non-limiting example, the LTE PBCH is transmitted every 10 subframes, but with four different redundancy versions transmitted in four consecutive transmissions. Hence, the same signal is transmitted every 40 subframes, assuming the system information has not changed. Another example is CRS in LTE, which (for an antenna port) is transmitted every few OFDM symbols, but using different symbol values in different OFDM symbols, where the same CRS symbol values are repeated every 10 subframes. A third example is SSS in LTE which is transmitted every 5 ms, but with only every second SSS being the same signal.

In some communication systems, a signal can be transmitted repetitively such that there is some time between the end of one transmission and the beginning of the next transmission, as in the examples above. A signal can also be transmitted repetitively such that there is no time between the end of one transmission and the beginning of the next transmission. A signal can also be transmitted repetitively in a combination of the two ways just mentioned. For a non-limiting example, LTE PRS signals can be transmitted in a burst (also called a positioning occasion) with PRS in up to 6 consecutive subframes. Such PRS bursts could then be transmitted periodically with a configurable period of 160-1280 subframes.

In some communication systems, a receiver may receive signals only in certain time gaps, here called reception gaps. The reception gaps can be configurable, fully or partly, for example by the network. The reception gap properties can be static, fully or partly, for example as specified in a communication standard, such as LTE. The reception gaps can be periodic. A reception gap configuration could for example be a gap length, period and time offset, which means that a reception gap with the gap length is repeated with the gap period and with a time offset in relation to a reference time. In another example, a reception gap configuration is a pattern of gaps that is repeated periodically. A reception gap configuration could be valid for one or multiple (frequency) carriers. A receiver could be configured with multiple reception gap configurations, for instance one configuration for one carrier and another configuration for another carrier. A receiver could be configured with a reception gap configuration that is valid for multiple carriers, and even for multiple radio access technologies (RATs). Different receivers can have different receiver gap configurations. A receiver can also have multiple reception gap configurations that are valid for the same carrier, with individual properties, such as period, length and offset.

In some communication systems, an LTE UE can be configured to perform inter-frequency cell search, measurements, etc., in certain measurement gaps. During a measurement gap, a UE does not have to receive signals on the serving cell. A single measurement gap in LTE is 6 ms (i.e. 6 subframes) long. The period can be set to either 40 ms, together with a time offset between 0 and 39 ms, or 80 ms, together with a time offset between 0 and 79 ms. The measurement gap configuration is UE specific, which means that different UEs may have different periods and offsets.

An irregular transmission of a signal on a carrier means that it is transmitted so infrequently or sparsely that there is a risk that a UE with a receiver gap configuration for the carrier doesn't receive a signal in any of its reception gaps. In some embodiments, signal transmission irregularity is only considered for signals targeting multiple receivers, such as reference signals, synchronization signals, discovery signals or broadcast channels. In some embodiments, a reason for irregular signal transmission is to save power. In some embodiments, a reason for irregular signal transmission is to reduce interference.

In some communication systems, e.g. LTE, it is possible to configure a receiver to receive signals only in certain reception gaps. During the other times, the receiver may be turned off. The purpose of such a scheme could be to reduce the receiver power consumption. In LTE, this is called discontinuous reception (DRX). Some receivers can be expected to receive signals only during their configured reception gaps.

Irregularly transmitted signals are transmitted so infrequently that there is a risk that a receiver with reception gaps, defined for instance by measurement gaps and/or DRX, does not receive the irregularly transmitted signal at all. In the example of LTE, the regular PSS/SSS periodicity is 5 ms, i.e. 320 times in 1.6 seconds. In an irregular PSS/SSS transmission, they could be transmitted less frequently, for instance only 16 times in 1.6 seconds. Then there is a risk that a UE with measurement gaps doesn't receive such an irregularly transmitted PSS/SSS in any of its gaps. Also, there is a trade-off between signal transmission irregularity and receivers receiving a signal often. In fact, for some combinations of irregular signal transmission and reception gap configurations, some receivers may never receive the signal at all. For example, consider a signal transmitted during 1 ms every 1600 ms and a receiver with a periodic reception gap with a period of 80 ms, a gap length of 6 ms and a gap time offset between 0 and 79 ms. In this example, the receiver may receive the signal in every 20th reception gap, if the gap time offset matches the irregular signal transmission, i.e. if the irregular signal transmission occurs within a reception gap. For all other gap time offsets, the receiver will not receive the signal at all, in any reception gap.

SUMMARY OF THE INVENTION

This disclosure presents systems and methods to transmit signals repeatedly but irregularly (sparsely) over a mobile communication network (carrier) in which reception gaps apply while increasing the likelihood that receivers will receive a signal at least once during a time interval called an irregular signal period. First, a set of transmission offsets is selected, the transmission offsets defining a relative transmission time in a burst, such that if a burst of signals using each transmission offset is transmitted, then a receiver with any valid reception gap configuration will receive at least one signal in its whole duration. Then, during the irregular signal period, the signals are transmitted in one or more bursts using each of the transmission offsets in the selected set at least once, to make sure that a receiver with any valid reception gap configuration receives at least one of the signals, wherein the burst may be preceded and/or followed by a period of no signal transmission. Finally, a receiver receives at least one of the signals in its whole duration during one of the reception gaps of the receiver.

The disclosure also presents systems and methods to multiplex multiple different irregularly transmitted signals, while still guaranteeing that receivers with any valid reception gap configuration will receive each of these different signals at least once during an certain time period.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

Various embodiments are illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

The present invention is directed toward systems and methods for a cellular or mobile communication system. Embodiments of the invention are described herein in the context of an LTE network. The invention, however, is not limited to only LTE networks, and the methods described herein can also be utilized in other applications such as mobile-to-mobile communications, wireless local loop communications, wireless relay communications, or wireless backhaul communications, for non-limiting examples.

Figure 1:
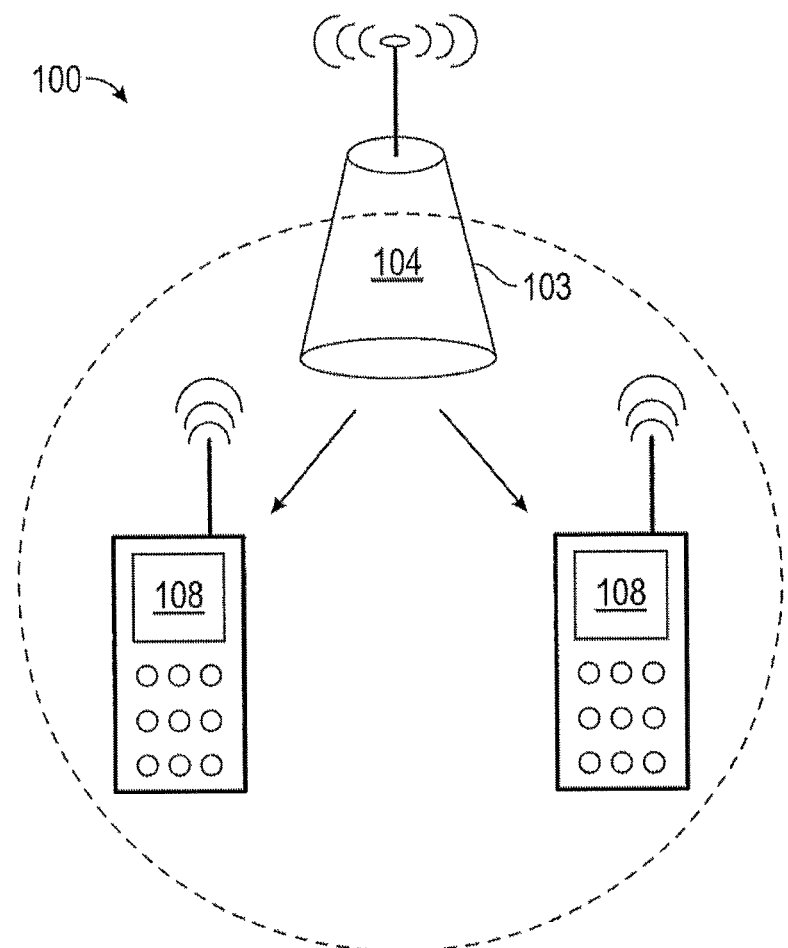
FIG. 1 depicts an example of a system to support irregular signal transmission in a mobile communication network with reception gaps in accordance with one or more embodiments of the invention.

FIG. 1 depicts an example of a system 100 to support irregular signal transmission in a mobile communication network with reception gaps. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, system 100 includes a selection unit 103, one or more transmitters 104, and one or more receivers 108. As referred to hereinafter, the selection unit 103 can run in a server in the mobile communication network or on a processor in a cell or base station. The transmitter 104 can be, but is not required to be associated with a cell, a macro base station, a high transmit power base station, a low-power node, or any other types of the base station operable to transmit cell identities to the receiver 108 in a multi-layered network for identification and connection. The receiver 108 can be, but is not required to be associated with a mobile or user equipment (UE) within the coverage of a cell, wherein the UE can be but is not limited to one of a mobile computing, storage, or communication device, such as a laptop PC, a tablet PC, an iPod, an iPhone, an iPad, a Google Android device, a portable storage device, or a cell phone.

As referred to hereinafter, minimum gap length refers to the minimum reception gap length among a set of receivers 108 within a cellular network. In some embodiments, the reception gap length of all receivers 108 is equal to the minimum gap length. Measurement gaps in LTE, for example, are all equal to 6 ms, which is then equal to the minimum gap length in that context. In some embodiments, the signal duration is smaller than or equal to the minimum gap length, so that a signal can be received in its whole duration within a single reception gap.

As referred to hereinafter, maximum gap period refers to the maximum reception gap period (including gap pattern period) among a set of receivers 108 within a cellular network. In LTE, for example, the measurement gap periods can be configured to 40 ms or 80 ms. If both these configurations are used (e.g. in a network or in a set of cells), then the maximum gap period may be 80 ms. If only the 40 ms configuration is used, then the maximum gap period may be 40 ms. Note that additional measurement gap periods may be introduced in future LTE releases.

As referred to hereinafter, irregular signal period is defined as a period during which a receiver 108 with a valid reception gap configuration receives a signal in its whole duration at least once. This definition means that an irregular signal period can be extended arbitrarily by adding time without any signal transmission. This could for example reduce power consumption and/or reduce interference. However, a drawback of extending an irregular signal period is that the time delay before a receiver 108 receives a signal may increase. Hence, there may be a trade-off between a long irregular signal period (lower power consumption and/or interference and/or longer delay) and a short irregular signal period (higher power consumption and/or interference and/or shorter delay). Hence, the irregular signal period can be seen as an input parameter to the signal transmission pattern design.

In the example of FIG. 1, the selection unit 103 is configured to select a set of transmission offsets for transmission of the irregular signals in one or more bursts. A transmission offset describes the signal transmission time within a burst. In some embodiments, the offsets are in relation to a reference timing. In some embodiments, the offsets are between 0 and the maximum gap period (or maximum gap period−1 in another embodiment where a discrete time is used), since the time duration of a burst equals the maximum gap period. Hence, in some embodiments, signals may be transmitted by the transmitter 104 between time 0 and time maximum gap period+duration, i.e. the first signal in the set may start at time (offset) 0 and the last signal in the set may start at time (offset) maximum gap period and end at maximum gap period+duration. In some embodiments, signals may be transmitted at discrete time by the transmitter 104 between time 0 and time maximum gap period+duration−1, i.e. the first signal in the burst may start at time (offset) 0 and the last signal in the burst may start at time (offset) maximum gap period and end at maximum gap period+duration−1. In some embodiments, by the transmitter 104 is configured to shift the offsets in time in the set (0 to maximum gap period) due to the choice of another reference timing.

In some embodiments, the set of transmission offsets has the property that a receiver 108 with any valid reception gap configuration receives a signal transmitted by the transmitter 104 in its whole duration within a signal transmission burst that uses all offsets in the set. Here, the signal transmission burst using all offsets in the set includes consecutive transmissions of signals using all offsets in the set. In some embodiments, the set of offsets is set to be as small as possible.

Figure 2:
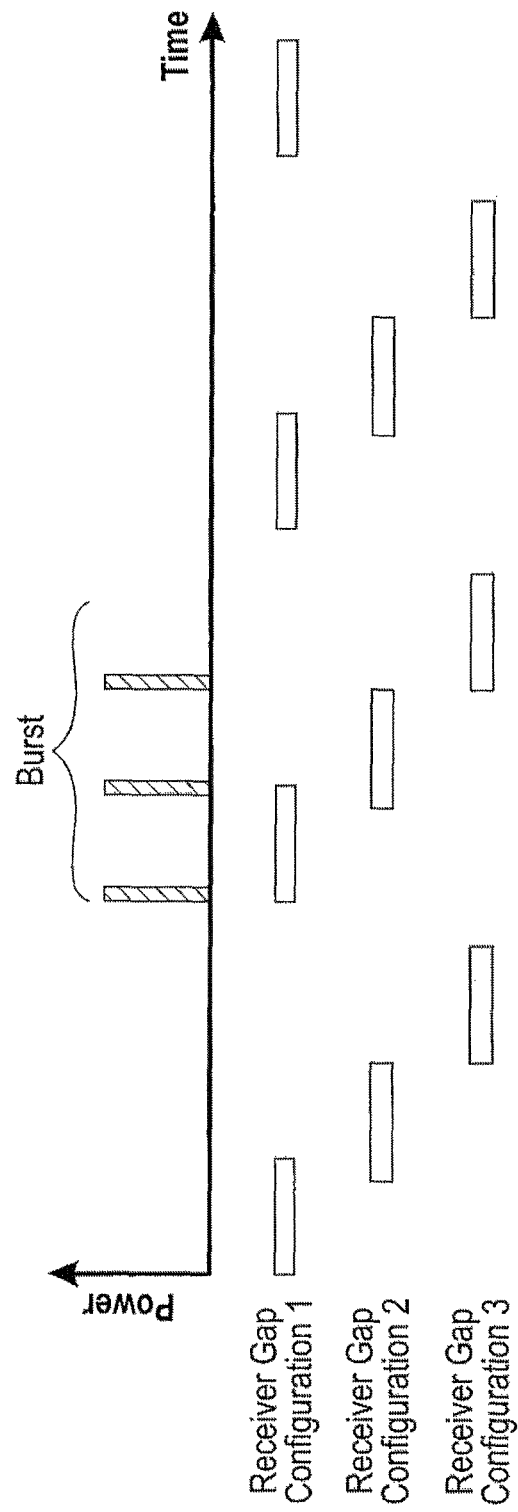
FIG. 2 depicts an example of a set of transmission offsets in accordance with one or more embodiments of the invention.

FIG. 2 depicts an example of a set of transmission offsets. In the example depicted in FIG. 2, there are three offsets in the set of transmission offsets and three example valid receiver gap configurations. The valid receiver gap configurations include periodic gaps with a fixed gap length, where only the time offset is varied between configurations and the length of the burst is equal to the maximum gap period+duration. As depicted in FIG. 2, a signal is received in its whole duration within any valid reception gap (in this example, for any time offset). Hence, the set of transmission offsets fulfills the properties described above.

In some embodiments, the reception gaps are configured for a receiver 108 served on another carrier (e.g. f1) than the carrier on which a signal is transmitted irregularly (e.g. f2), but with the receiver 108 performing inter-frequency measurements on f2 during the reception gaps.

There are several situations where it could be beneficial to spread out the reception gaps of different receivers 108 in time where overlaps among the reception gaps of the receivers in time could have a negative impact. For two non-limiting examples:

For inter-frequency/RAT measurements, consider a wireless communication system with a number of receivers being served on a carrier f1. Furthermore, assume that most receivers 108 need to be configured with reception gaps in which they can be expected not to receive any signal on f1. Instead, the receivers may receive signals on other carriers that possibly use other RATs, for example, to perform cell search and/or measurements. If the reception gaps of the receivers being served on f1 are configured such that they overlap, then there may be a negative impact on the performance on f1. The reason is that during overlapping reception gaps, the scheduler on f1 has less opportunities, and in the worst case no opportunities, to schedule for example data transmission to receivers on f1. If the reception gaps of the receivers served on f1 are spread out in time instead, then it is less likely that the f1 scheduler experiences times with too few (perhaps no) receivers that can be scheduled. In some embodiments, an LTE UE may perform inter-frequency and/or inter-RAT cell-search, measurements and/or other operations during reception gaps, which in some embodiments are LTE measurement gaps.

For discontinuous reception (DRX), consider a communication system where many receivers are configured with DRX so that they receive a signal only in their configured reception gaps, which may be different for different receivers. As mentioned above, it may be beneficial to spread out the reception gaps in time, in order to continuously give a scheduler a decent set of receivers to choose from. Note that for the DRX example in this subsection, a receiver is available for reception (and therefore scheduling) only during the reception gaps. For the inter-frequency/RAT measurement example described above, a receiver is available for reception (on f1) only outside the reception gaps.

In some embodiments, the reception gaps can be of different kinds. In an LTE example, the reception gaps could be both measurement gaps and due to DRX.

In some embodiments, the transmitter 104 is configured to uniformly distribute the signal offsets within the burst with a periodicity of minimum gap length−duration. Since the reception gaps are not shorter than minimum gap length, each reception gap will contain a signal in its whole duration. In the non-limiting example of the measurement gaps in LTE, which have a length of 6 ms and a period of 40 ms or 80 ms, the minimum gap length is equal to 6 ms. If both 40 ms and 80 ms periods are configured among the receivers 108, then the maximum gap period is 80 ms. In some embodiments, the transmitter 104 is configured to select the gap offsets with 1 ms granularity. In another non-limiting example of a signal with a duration of 1 ms (similar to PRS or CSI-RS in LTE), minimum gap length–duration equals 5 ms, which may be the signal periodicity within a burst. One example of a transmission offset set with 14 elements is {0 5 10 15 . . . 60 65 70 75} ms, which means that signals are transmitted with start offset of 0, 5, etc. Since both the maximum gap period and the burst is 80 ms, a receiver 108 with any measurement gap configuration will have a gap occur during the burst. Since a gap is 6 ms long, a measurement gap during the burst will contain a signal in its whole duration.

In some embodiments, the transmitter 104 is configured to transmit a single burst within an irregular signal period. In some embodiments, the transmitter 104 is configured to transmit a plurality of bursts with the same time offsets (with a time offset defining the transmission time of a burst within an irregular signal periods) within multiple consecutive irregular signal periods (also referred to as "bursty transmission'). In another embodiment, the transmitter 104 is configured to transmit bursts with different or partly different time offsets (with a time offset defining the transmission time of a burst within an irregular signal periods) within multiple consecutive irregular signal periods. In some embodiments, the transmitter 104 is configured to utilize different sets of transmission offsets in different irregular signal periods (with a transmission offset defining the transmission time of a signal within a burst). In some embodiments, the set of transmission offsets are similar to those in the LTE measurement gap embodiment described above, e.g., with offsets {0 5 . . . 70 75} ms in one example. In another example, the offsets can be {1 6 . . . 71 76} ms, {2 7 . . . 72 77} ms, {3 8 . . . 73 78} ms or {4 9 . . . 74 79} ms. Following the bursty transmission, the signal is not transmitted by the transmitter 104 for a long time, e.g., 1520 ms, meaning that a burst is transmitted periodically with a period of 1600 ms. In some embodiments, the transmitter 104 is configured to transmit multiple bursts with different time offsets within the irregular signal period.

Figure 3:
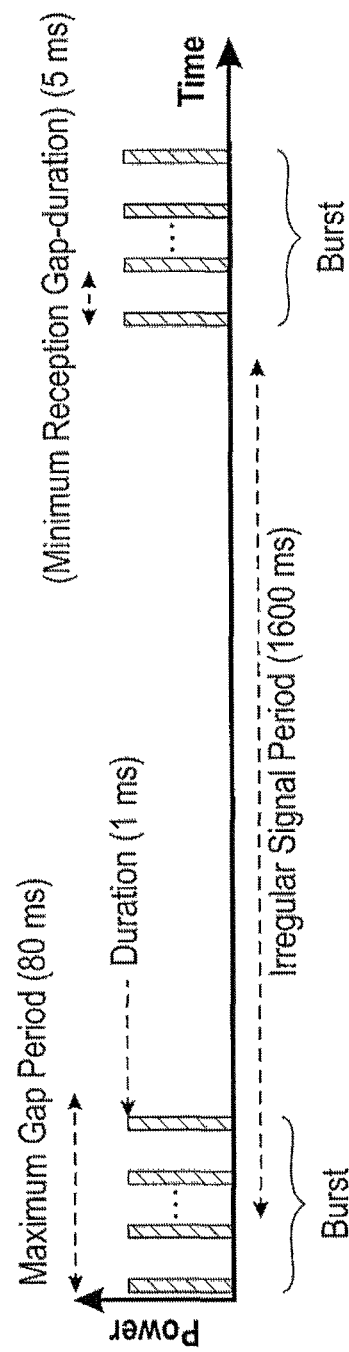
FIG. 3 depicts an example of burst transmission within an irregular signal period with example numbers in parentheses in accordance with one or more embodiments of the invention.

FIG. 3 depicts an example of burst transmission within an irregular signal period with example numbers in parentheses from the LTE embodiment discussed above. The bursty transmission makes sure that a receiver 108 with any reception gap configuration receives a signal during a burst. In the example depicted in FIG. 3, a signal duration is 1 ms, the signals within a burst are transmitted with a period of 5 ms and the burst lasts 80 ms. The last 4 ms of the burst contains no signal. In the example depicted in FIG. 3, a part of the next irregular signal period can be seen, which contains the next burst. In some embodiments, a receiver 108 is informed, for instance by the transmitter 104 via a network, when a burst is transmitted within an irregular signal period to make sure that the receiver 108 is turned on during a burst.

In some embodiments, the transmitter 104 is configured to support distributed (i.e. not bursty) signal transmission within an irregular signal period when the maximum gap period, i.e. the time duration of a burst, is a multiple of the valid reception gap periods of the receivers 108 so that the relative time offset between a reception gap and a reduced burst is maintained in a sequence of consecutive bursts, i.e. the next reduced burst starts at the end of the previous. In the example of LTE with reception gap periods 40 ms and 80 ms, the maximum gap period is 80 ms, which is a multiple of 40 ms and 80 ms. In some embodiments, an irregular signal transmission by the transmitter 104 is as follows. A sequence of consecutive reduced bursts are transmitted within an irregular signal period, wherein each of the reduced bursts has the same time duration as a burst, i.e. maximum gap period, where the signals are transmitted using a subset of the transmission offsets. Note that a subset may be empty, i.e. no signal is transmitted in a reduced burst. In a sequence of reduced bursts within an irregular signal period, signals with all offsets in the set of transmission offsets are used at least once.

In some embodiments, a sequence of reduced bursts does not start at the same time as an irregular signal period. In some embodiments, a sequence of reduced bursts does not end at the same time as an irregular signal period. In some embodiments, each offset in a set of transmission offsets is used once within an irregular signal period, i.e. in at least one of the reduced bursts. In some embodiments, different sets of transmission offsets may be used in different irregular signal periods.

In an example of LTE, measurement gaps with periods 40 ms and 80 ms or only 80 ms are configured. Therefore, the maximum gap period is 80 ms, which is also the time duration of the reduced bursts. A set of transmission offsets, e.g., {0 5 . . . 70 75} ms can be used. In other embodiments, the offsets can be {1 6 . . . 71 76} ms, {2 7 . . . 72 77} ms, {3 8 . . . 73 78} ms or {4 9 . . . 74 79} ms. In some embodiments, the irregular signal transmission by the transmitter 104 follows the steps:

In the first reduced burst within the irregular signal period, a single signal is transmitted using an offset from the set. For example, the subset of transmission offsets could be {0}.

In the second reduced burst within the irregular signal period, which follows directly after the first, a single signal is transmitted using an offset from the set. For example, the subset of transmission offsets could be {5}.

. . .

In the 16th reduced burst within the irregular signal period, a single signal is transmitted using an offset from the set. For example, the subset of transmission offsets could be {75}.

In the 17th, 18th, 19th and 20th reduced bursts, the subset of transmission offsets could be empty. This would mean that no signal (of the kind considered here) is transmitted.

Figure 4:
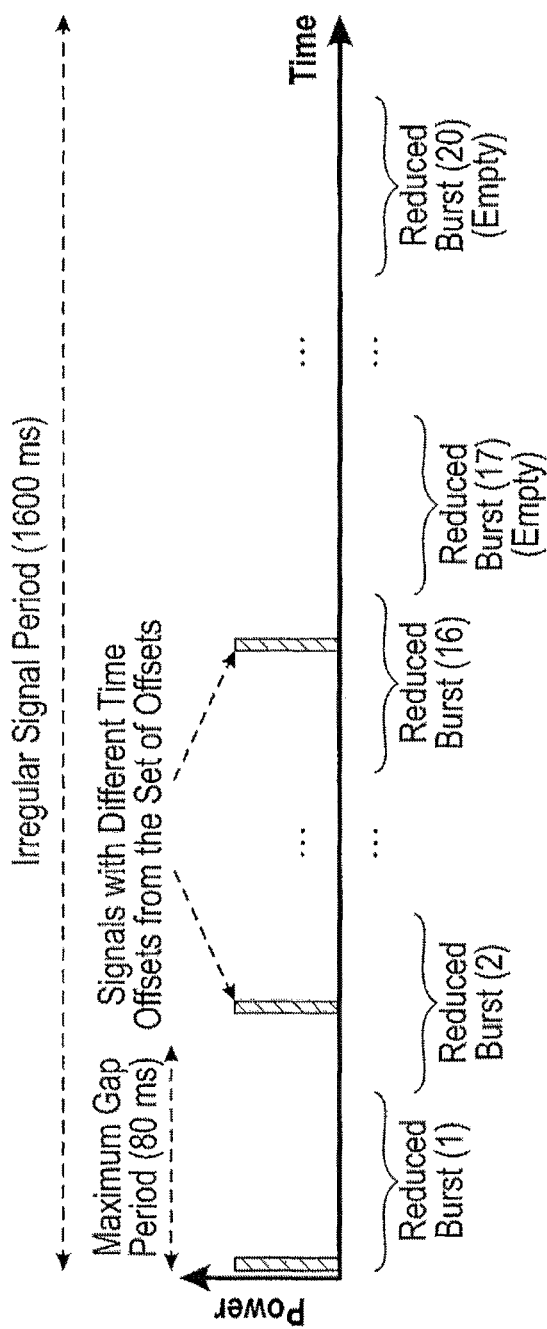
FIG. 4 depicts an example of distributed signal transmission within an irregular signal period with example numbers in parentheses in accordance with one or more embodiments of the invention.

FIG. 4 depicts an example of distributed signal transmission within an irregular signal period with example numbers in parentheses from the LTE embodiment discussed above. Such distributed signal transmission ensures that a receiver 108 with any reception gap configuration receives a signal in at least one of the reduced bursts within an irregular signal period.

Figure 5:
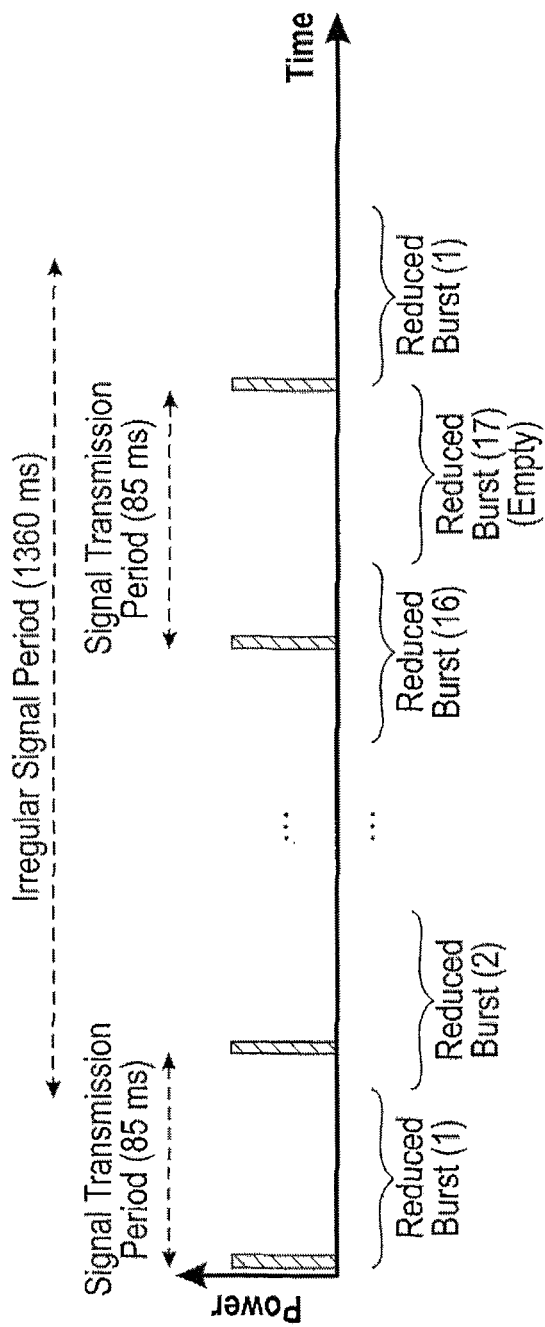
FIG. 5 depicts an example of periodic signal transmission using the distributed signal transmission framework in accordance with one or more embodiments of the invention.

In some embodiments, the distributed signal transmission as described above results in a periodic signal transmission. In some embodiments, the transmitter 104 is configured to transmit the signals with a period of 85 ms similar to the LTE embodiment above (with 20 reduced bursts) except that the 16th reduced burst (with an offset 75) would be followed by an empty 17th reduced burst before a first reduced burst (with offset 0) would be transmitted again. Hence, the irregular signal period would be 17 reduced bursts long, i.e. 1360 ms in this example as illustrated by the example of periodic signal transmission using the distributed signal transmission framework depicted in FIG. 5. Other periodic irregular signal transmission embodiments may be covered by the framework of distributed signal transmission within an irregular signal period, with other sets of transmission offsets. Note that the rightmost reduced burst (1) in the example of FIG. 5 belongs to the next irregular signal period. In some embodiments, a receiver 108 is informed, for instance by the transmitter 104, about the properties of a distributed transmission to make sure that the receiver is turned on during the reception gap in which a signal can be received.

In the example of FIG. 1, the receiver 108 is configured to receive different irregularly transmitted signals within the reception gaps. In some embodiments, the different irregularly transmitted signals are transmitted by different transmitters 104. In some embodiments, the different irregularly transmitted signals are the same kind of signal, but transmitted on different times and/or frequencies and/or using different codes or sequences so that the different signals can be distinguished by the receiver 108. In some embodiments, the irregular signal periods of the different signals are equal. In some embodiments, the irregular signal periods of the different signals are different.

In some embodiments, the receiver 108, if configured with reception gaps, may receive a signal that is transmitted irregularly. In some embodiments, it is desirable that the receiver 108 configured with reception gaps receives an irregularly transmitted signal as often as possible. If a signal is received often, a receiver may perform certain actions with less delay, which may improve its performance. For instance, if the receiver 108 in a cellular communication system can perform signal strength measurements more often, then it is possible to initiate and perform hand over to another cell more rapidly, thereby improving the performance.

As non-limiting examples in the following discussion, it is assumed that the different irregularly transmitted signals are transmitted by different transmitters and the different signals have the same irregular signal period.

Figure 6:
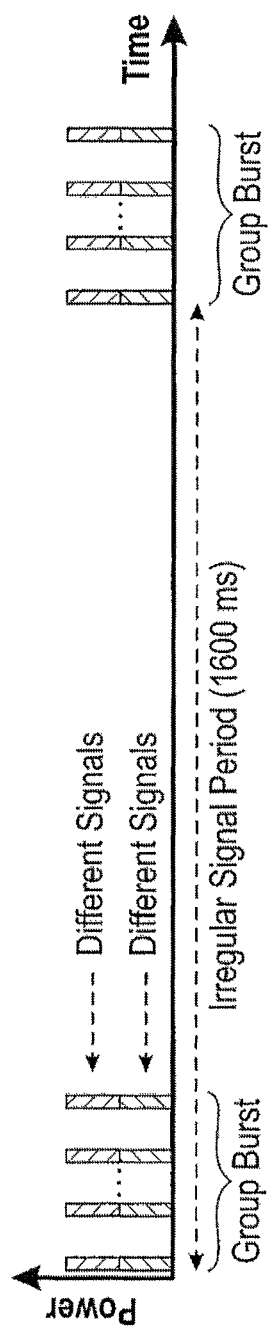
FIG. 6 depicts an example of a group burst where the bursts of two different signals are transmitted simultaneously in accordance with one or more embodiments of the invention.

In some embodiments, the receiver 108 is configured to distinguish among a group of different signals transmitted during the same time (referred to as a group signal), using for instance code, frequency and/or space multiplexing or some other kind of multiplexing. In some embodiments, different irregularly transmitted signals use bursty irregular signal transmission as discussed above with the bursts occurring at the same time. In some embodiments, a burst of group signals may be transmitted as a group burst. A group burst is a group of bursts transmitted at the same time, using for instance code, frequency and/or space multiplexing. FIG. 6 depicts an example of a group burst, where the bursts of two different signals are transmitted simultaneously using for instance code or frequency multiplexing. Since each of the irregularly transmitted signals in a group burst fulfills the properties of a single irregularly transmitted signal, as described above, the receiver 108 with any valid reception gap configuration can receive each signal in a group burst in its whole duration in at least one reception gap.

In some embodiments, the different signals are discovery signals using the unused REs next to PSS/SSS in LTE. In some embodiments, the discovery signals from different transmitters 104 of different cells are transmitted next to the same PSS/SSS using code, frequency and/or space multiplexing. By using multiplexing, more cells can be discovered by the receivers 108. In some embodiments, discovery signals are transmitted next to each PSS/SSS during a group burst, i.e. every 5 ms. In some embodiments, different irregularly transmitted signals use distributed irregular signal transmission as discussed above with the signals in the reduced bursts being transmitted at the same time.

Figure 7:
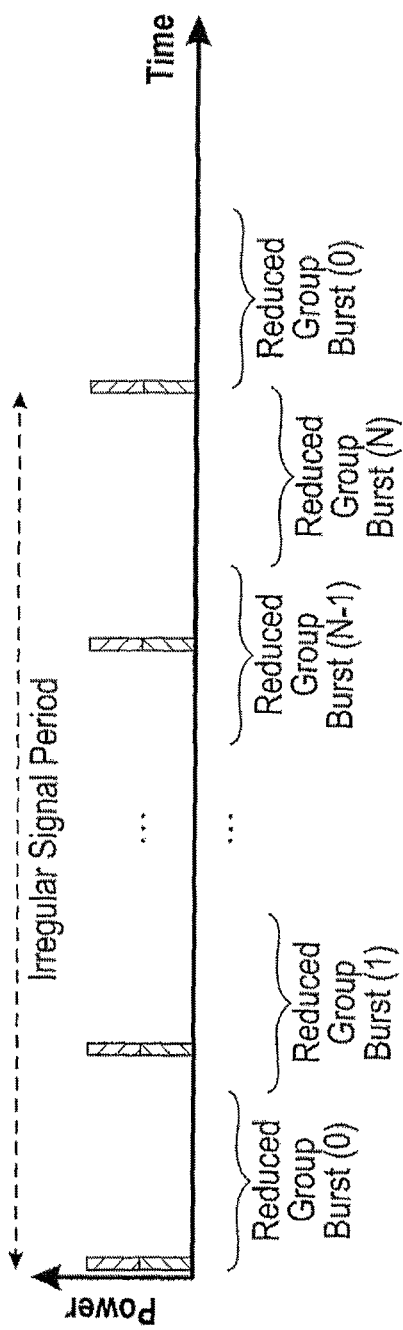
FIG. 7 depicts an example of reduced bursts of two different signals transmitted simultaneously in a sequence of reduced group bursts in accordance with one or more embodiments of the invention.

In some embodiments, the transmitter 104 is configured to transmit a reduced burst of group signals as a reduced group burst. The reduced group burst is a group of reduced bursts transmitted at the same time, using for instance code, frequency and/or space multiplexing and with the signals transmitted using the same offsets as depicted in the example in FIG. 7, where the reduced bursts of two different signals are transmitted simultaneously in a sequence of reduced group bursts using for instance code- or frequency multiplexing. Reduced bursts that are multiplexed in such a way are called reduced group bursts. Since each of the irregularly transmitted signals in a sequence of reduced group bursts fulfills the properties of a single irregularly transmitted signal, the receiver 108 with any valid reception gap configuration can receive each signal in a sequence of reduced group bursts in its whole duration in at least one reception gap. For a non-limiting example, with maximum gap period being 80 ms and the set of transmission offsets being {0, 5, 10, 15, . . . , 65, 70, 75}, a first set of transmitters 104 may use reduced group burst (0) with offsets {0, 10, 20, . . . , 60, 70} ms and reduced group burst (1) with offsets {5, 15, 25, . . . , 65, 75} ms, while a second set of transmitters 104 may use reduced group burst (0) with offsets {5, 15, 25, . . . , 65, 75} ms and reduced group burst (1) with offsets {0, 10, 20, . . . , 60, 70} ms. In the embodiment with a DS on the REs next to PSS/SSS, the first set of transmitters 104 transmit DS next to the PSS/SSS in subframe 0 during 8 radio frames (i.e. 80 ms), whereas the second set of transmitters 104 transmit DS next to the PSS/SSS in subframe 5 during 8 radio frames. During the next 8 radio frames, the sets of transmitters 104 switch subframe for DS transmission. Other embodiments may have different parameters, for instance maximum gap period or set of transmission offsets. In another embodiment, more sets of cells are time interleaved, using more reduced group bursts.

Figure 8:
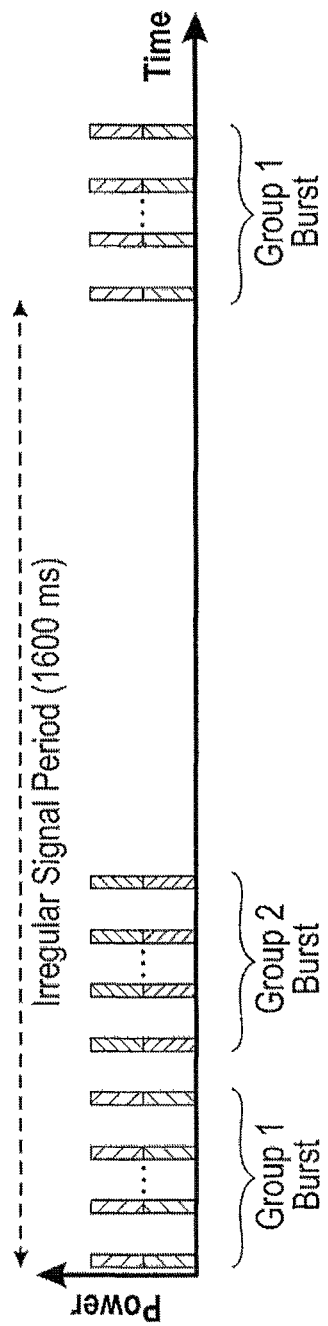
FIG. 8 depicts an example of two group bursts of different signals that are time-multiplexed in accordance with one or more embodiments of the invention.

In some embodiments, one or more (different) transmitters 104 are configured to transmit bursts of different irregularly transmitted signals such that they do not overlap, i.e., the bursts are time-multiplexed. In some embodiments, time-multiplexing of bursts is combined with other kinds of signal multiplexing as illustrated by the example depicted in FIG. 8, where two group bursts of different signals are time-multiplexed. In the first group burst, two different signals are transmitted. In the second group burst, two other signals are transmitted. Together, four different irregularly transmitted signals are transmitted during the same irregular signal period. The bursts of different signals can be time-multiplexed in addition to the other forms of multiplexing described above. Since each of the irregularly transmitted signals in the different group bursts fulfills the properties of a single irregularly transmitted signal, a receiver 108 with any valid reception gap configuration can receive each of the different multiplexed signals in its whole duration in at least one reception gap.

In some embodiments, one or more (different) transmitters 104 are configured to transmit reduced bursts of the group of different irregularly transmitted signals at the same time such that the signals do not overlap, i.e. the different signals are interleaved in time in the reduced bursts. In some embodiments, interleaving in simultaneous reduced bursts is combined with other kinds of signal multiplexing discussed above as illustrated by the example depicted in FIG. 9, where two reduced group bursts are interleaved. Together, four different irregularly transmitted signals are transmitted during the same irregular signal period. In some embodiments, the reduced bursts of different signals can be interleaved in time, in addition to the other forms of multiplexing described above. Since each of the irregularly transmitted signals in the different reduced group bursts fulfills the properties of a single irregularly transmitted signal, a receiver 108 with any valid reception gap configuration can receive each of the different multiplexed signals in its whole duration in at least one reception gap. An interleaved signal transmission has the benefit over a bursty signal transmission in that a receiver 108 that is configured to receive continuously can receive all different irregularly transmitted signals with shorter delay.

In some embodiments, the transmitter 104 is configured to split and transmit some signals into multiple different signal parts that are separated in time. Repetitive signals may be split in multiple different repetitive signal parts. In some embodiments, the receiver 108 is configured to utilize the multiple signals parts received to perform the operations that are the purpose of the signal so that the signal duration spans the multiple signal parts. However, in some embodiments, it is not necessary that the multiple signal parts are received in the same reception gap for the receiver 108 to successfully perform the operations that are the purpose of the signal. In such case, different signal parts corresponding to the same signal can be received in different reception gaps. In some embodiments, the transmitter 104 is configured to select a set of transmission offsets so that each of the different signal parts is received in at least one reception gap during an irregular signal period for any valid reception gap configuration.

In some embodiments, a receiver 108 is informed of the presence and/or parameters of an irregular signal transmission. In some embodiments, the receiver 108 is informed of the presence and/or parameters of multiple irregular signal transmissions. In some embodiments, the information above is provided by the transmitter 104, or a network, for instance, a mobile network.

Figure 9:
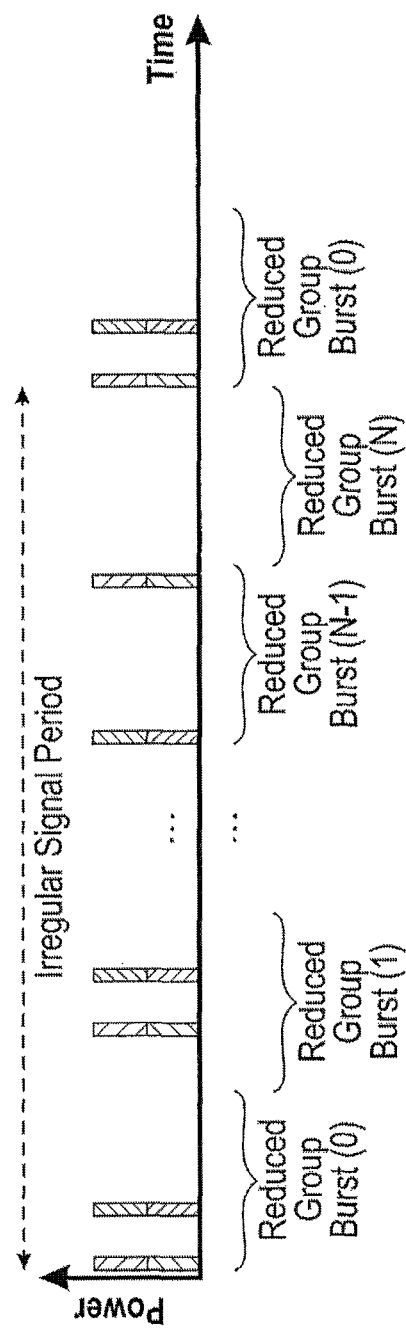
FIG. 9 depicts an example of two reduced group bursts that are interleaved in accordance with one or more embodiments of the invention.

In some embodiments, the receiver 108 is configured to detect the presence of the multiple irregular signal transmissions and/or which transmission parameters that are in use. In one example, there may be two different possible irregular signal periods. By estimating a correlation function of the received signal (e.g. auto correlation in time), the receiver 108 can detect which of the irregular signal periods that is in use. In some embodiments, the receiver 108 is configured to estimate a correlation function in two steps. In the first step, a correlation in dimensions other than time is estimated, for instance, code/sequence and/or frequency. In a second step, a correlation in the time domain is estimated based on the code/sequence/frequency correlation. For example, if multiple different signals (e.g. different modulated sequences) can be transmitted in the same time occasion, as illustrated in FIG. 9 above, a correlation to each such signal can be computed by a receiver for each occasion, wherein the correlation could correspond to the received power of the corresponding signal/sequence. A correlation of such powers (or amplitudes) in the time domain could then be computed by a receiver. Assuming some level of stationarity, the signal powers/amplitudes would be repeated in time according to the irregular signal period, which could be observed on a temporal correlation in a second step. The irregular signal period could then be estimated. In some embodiments, different irregular signal periods correspond to different transmission parameters, and thus, by detecting the irregular signal period, the receiver 108 can also implicitly detect other transmission parameters.

In some embodiments, the receiver 108 is configured to estimate a correlation function based on signals received in the reception gaps. In some embodiments, the irregularly transmitted signal is such that an estimated correlation function can be used to properly estimate transmission parameters, such as the irregular signal period, regardless of the reception gap configuration of the receiver.

In some embodiments, the receiver 108 is configured to detect the relative timing of the irregular signal period in relation to a reference time. In an LTE embodiment, a receiver has obtained frame synchronization, for example, by using PSS/SSS, but not the system frame number (SFN). In some embodiments, the start of an irregular signal period is defined in relation to the SFN or a part of the SFN (for example the least significant bits). In some embodiments, the receiver 108 is configured to detect the start of an irregular signal period without first obtaining SFN. In some embodiments, the receiver 108 is configured to jointly detect the irregular signal period as well as the start of an irregular signal period.

In some embodiments, the different irregularly transmitted signals are small cell DSs transmitted from a plurality of small cells. In some embodiments, the small cells can be divided into clusters of small cells. In some embodiments, the receiver 108 is configured with one or more out of a first set of gap offsets or configurations (also referred to as cluster identification gap) if it is unknown to which cluster the receiver 108 is closest This set may contain a single offset. In some embodiments, the irregular signal transmissions are multiplexed in such a way that for gap offsets in the set, it can be rapidly detected to which cluster a receiver is closest. In some embodiments, the receiver 108 is configured with one or more out of a second set of reception gap offsets or configurations (also referred to as cell identification gap) if it is known to which cluster the receiver is closest. This set may contain a single reception gap offset. In some embodiments, the irregularly transmitted signals are multiplexed by the different cells/base stations in such a way that for gap offsets in the set, it can be rapidly detected to which cell/base station in the cluster the receiver 108 is closest. By having one set of reception gap offsets (cluster identification gap) for general discovery of which cluster the receiver 108 is closest to and other sets of gap offsets (cell identification gap) for discovery of which cell in a cluster the receiver 108 is closest to, the discovery time could be reduced. The method above can also be useful in a situation where not all signals from all small cells (within some area) fit within one gap, for instance if the number of small cells is very large, but a signal from each cluster fits within one gap. After the identification of the closest cluster using a cluster identification gap, a corresponding cell identification gap is configured so that the closest cell in the cluster can be discovered.

Figure 10:
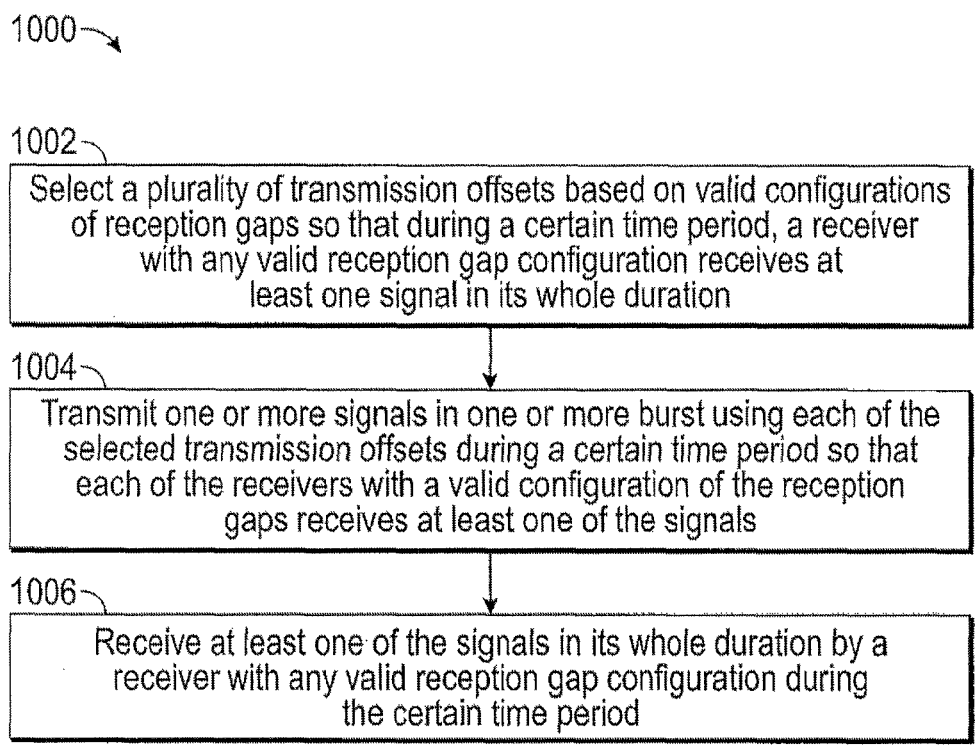
FIG. 10 depicts a flowchart of an example of a process to support modified reference signal transmission for cell discovery in a mobile communication network in accordance with one or more embodiments of the invention.

FIG. 10 depicts a flowchart 1000 of an example of a process to support modified reference signal transmission for cell discovery in a mobile communication network. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 10, the flowchart 1000 starts at block 1002, where a plurality of transmission offsets are selected based on valid configurations of reception gaps so that during a certain time period, a receiver with any valid reception gap configuration receives at least one signal in its whole duration. The flowchart 1000 continues to block 1004, where one or more signals are transmitted in one or more bursts using each of the selected transmission offsets during a certain time period so that each of the receivers with a valid configuration of the reception gaps receives at least one of the signals. The flowchart 1000 ends at block 1006, where at least one of the signals is received in its whole duration by a receiver with any valid reception gap configuration during the certain time period.

The word "exemplary" is used herein to mean "serving as an example or illustration." Any aspect or design described herein as "exemplary" is not necessarily to be construed as preferred or advantageous over other aspects or designs.

The preceding merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions.

While one or more embodiments of the invention have been described above, it should be understood that they have been presented by way of example only, and not by way of limitation. Likewise, the various figures or diagrams may depict an example that is architectural or another configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by an appropriately configured module or unit. The term "module" or "unit" as used herein, can refer to hardware, firmware, software and any associated hardware that executes the software, and any combination of these elements for performing the associated functions described herein. Additionally, various modules and units can be discrete modules; however, as would be apparent to one of ordinary skill in the art, two or more modules may be combined to form a single module that performs the associated functions according various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and/or processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization required by the invention.

What is claimed is:

1. A system to support signal transmission in a mobile communication network, comprising:
   a selection unit, which in operation, is configured to select a plurality of transmission offsets based on a plurality of valid reception gap configurations such that if a burst of signals is transmitted using the plurality of transmission offsets, a receiver with any reception gap configuration receives at least one of the signals in its whole duration, wherein each of the transmission offsets defines a signal transmission time within the burst;
   a transmitter, which in operation, is configured to transmit one or more signals in one or more burst using each of the selected transmission offsets during a certain time period;
   the receiver with a valid configuration of the reception gaps, which in operation, is configured to receive at least one of the signals in its whole duration during the certain time period; and
   the certain time period is an irregular signal period during which the receiver receives one of the signals in its whole duration at least once.

2. The system of claim 1, wherein:
   the time duration of the burst is equal to a maximum reception gap period among the valid reception gap configurations.

3. The system of claim 1, wherein:
   each of the selection unit and the transmitter is one of a macro base station, a high transmit power base station, a low transmit power node (LPN), and another base station operable to transmit its cell identity to one of the UEs in a multi-layered network for identification and connection.

4. The system of claim 1, wherein:
   the receiver is configured to detect relative timing of the certain time period in relation to a reference time.

5. The system of claim 1, wherein:
   the transmitter is configured to transmit the bursts with the same transmission offsets within one or multiple consecutive irregular signal periods during which the receiver with the valid configuration of the reception gaps receives one of the signals in its whole duration at least once.

6. The system of claim 1, wherein:
the transmitter is configured to transmit the signals in a sequence of reduced bursts each having the same time duration as a regular burst while using a subset of the transmission offsets.

7. The system of claim 6, wherein:
the set of transmission offsets and the subsets used in the reduced bursts are selected such that the transmitted signal is periodic.

8. The system of claim 1, wherein:
the selection unit is configured to select the transmission offsets for a group of different signals.

9. The system of claim 8, wherein:
the transmitter is configured to time-multiplex the group of different signals.

10. The system of claim 1, wherein:
the transmitter is configured to uniformly distribute the signal offsets within the burst with a periodicity.

11. The system of claim 1, wherein:
the transmitter is configured to split and transmit some of the signals into multiple different signal parts that are separated in time.

12. The system of claim 1, wherein:
the receiver is configured to distinguish a group of different signals transmitted during the same time period.

13. The system of claim 1, wherein:
the receiver is configured to detect presence of the signals transmitted and/or which transmission parameters are in use.

14. The system of claim 13, wherein:
the receiver is configured to estimate a correlation function based on signals received in the reception gaps to estimate the transmission parameters.

15. The system of claim 1, wherein:
the transmitted signals are small cell discovery signals (DSs) from a plurality of small cells, wherein the plurality of small cells are divided into a plurality of clusters of small cells.

16. The system of claim 15, wherein:
the receiver is configured with one out of a first set of reception gap offsets if it is unknown to which cluster the receiver is closest.

17. The system of claim 16, wherein:
the transmitter is configured to multiplex the discovery signals in such a way that for the reception gap offsets in the first set the cluster to which the receiver is closest is detected.

18. The system of claim 16, wherein:
the first set contains a single reception gap offset.

19. The system of claim 15, wherein:
the small cells are configured with one out of a second set of reception gap offsets if it is known to which cluster the receiver is closest.

20. The system of claim 19, wherein:
the small cells are configured to multiplex the discovery signals in such a way that for the reception gap offsets in the second set the cell in the cluster to which the receiver is closest is detected.

21. The system of claim 19, wherein:
the second set contains a single reception gap offset.

22. A method to support signal transmission in a mobile communication network, comprising:
selecting a plurality of transmission offsets based on a plurality of valid reception gap configurations such that if a burst of signals is transmitted using the plurality of transmission offsets, a receiver with any reception gap configuration receives at least one of the signals in its whole duration, wherein each of the transmission offsets defines a signal transmission time within the burst;
transmitting one or more signals in one or more burst using each of the selected transmission offsets during a certain time period, wherein the certain time period is an irregular signal period during which the receiver receives one of the signals in its whole duration at least once;
receiving at least one of the signals in its whole duration during the certain time period by each of the receivers with a valid configuration of the reception gaps.

23. The method of claim 22, further comprising:
detecting relative timing of the certain time period in relation to a reference time.

24. The method of claim 22, wherein:
the time duration of the burst is equal to a maximum reception gap period among the valid reception gap configurations.

25. The method of claim 22, further comprising:
transmitting the bursts with the same transmission offsets within one or multiple consecutive time periods during which the receiver with the valid configuration of the reception gaps receives one of the signals in its whole duration at least once.

26. The method of claim 22, further comprising:
transmitting the signals in a sequence of reduced bursts each having the same time duration as a regular burst while using a subset of the transmission offsets, wherein the set of transmission offsets and the subsets used in the reduced bursts are selected such that the transmitted signal is periodic.

27. The method of claim 26, further comprising:
selecting the transmission offsets for a group of different signals and time-multiplexing the group of different signals.

28. The method of claim 22, further comprising:
transmit the signals periodically and/or uniformly distributing the signal offsets within the burst with a periodicity.

29. The method of claim 22, further comprising:
splitting and transmitting some of the signals into multiple different signal parts that are separated in time.

30. The method of claim 22, further comprising:
distinguishing a group of different signals transmitted during the same time period, wherein the different signals are discovery signals using unused resource elements (REs).

31. The method of claim 30, further comprising:
estimating a correlation function based on signals received in the reception gaps to estimate the transmission parameters.

32. The method of claim 22, further comprising:
detecting presence of the signals transmitted and/or which transmission parameters are in use.

33. The method of claim 22, wherein:
the transmitted signals are small cell discovery signals (DSs) from a plurality of small cells and the plurality of small cells are divided into a plurality of clusters of small cells.

34. The method of claim 33, wherein:
configuring the receiver with one out of a first set of reception gap offsets if it is unknown to which cluster the receiver is closest.

35. The method of claim 34, wherein:
multiplexing the discovery signals in such a way that for the reception gap offsets in the first set the cluster to which the receiver is closest is detected.

36. The method of claim 34, wherein:
the first set contains a single reception gap offset.

37. The method of claim 33, wherein:
configuring the receiver with one out of a second set of reception gap offsets if it is known to which cluster the receiver is closest.

38. The method of claim 37, wherein:
multiplexing the discovery signals in such a way that for the reception gap offsets in the second set the cell in the cluster to which the receiver is closest is detected.

39. The method of claim 37, wherein:
the second set contains a single reception gap offset.

\* \* \* \* \*